United States Patent [19]

Lidl

[11] 3,781,159
[45] Dec. 25, 1973

[54] COUNTERBALANCED MOUNT FOR SEPARABLE MOLD

[75] Inventor: Rolf Lidl, Munich, Germany

[73] Assignee: Krauss-Maffei A.G., Munich, Germany

[22] Filed: Dec. 8, 1971

[21] Appl. No.: 206,005

[30] Foreign Application Priority Data
Dec. 9, 1970  Germany............... P 20 60 478.8

[52] U.S. Cl.............. 425/450, 100/264, 249/162, 425/DIG. 205
[51] Int. Cl............................................. B29c 3/02
[58] Field of Search............ 425/450, 452, 326 R, 425/387 B, DIG. 205; 100/264; 83/623; 249/162

[56] References Cited
UNITED STATES PATENTS

| 2,523,066 | 9/1950 | Siefert............................ 100/264 X |
| 1,917,738 | 7/1933 | Schlagintweit.................. 249/162 X |
| 3,277,534 | 10/1966 | McDonald et al........ 425/387 B UX |
| 1,585,785 | 5/1926 | Parmley........................... 249/162 |
| 3,237,268 | 3/1966 | Yates............................. 249/162 X |
| 1,118,540 | 11/1914 | Ellingson......................... 249/162 |
| 812,336 | 2/1906 | Glatfelter...................... 249/162 X |

*Primary Examiner*—H. A. Kilby, Jr.
*Attorney*—Karl F. Ross

[57] ABSTRACT

A mount for a separable mold has a pair of elements each carrying one mold member and displaceable towards and away from each other. A lever arrangement including at least one rigid link is provided between the two elements so that on displacement of one of the elements in one direction the other is displaced in the opposite direction. With one element arranged above the other its weight plus that of its mold member counterbalances that of the other element and its mold member so that the only force that need be exerted to open the mold is that necessary to overcome friction and inertia. The lever linkage can be a pair of lever arms arranged as a scissor whose central pivot point is also a pivot for the whole mold to allow positioning thereof. Alternatively the elements can be pivoted with one acting as a first-order lever and the other as a third-order lever and with the various lever arms so dimensioned that the mold opens automatically when filled and closes automatically when emptied.

7 Claims, 6 Drawing Figures

3,781,159
FIG. 3
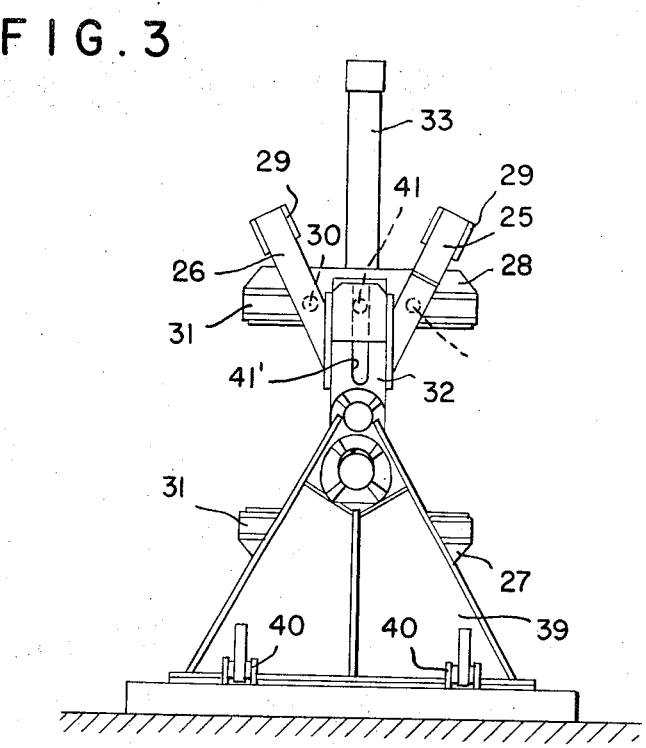
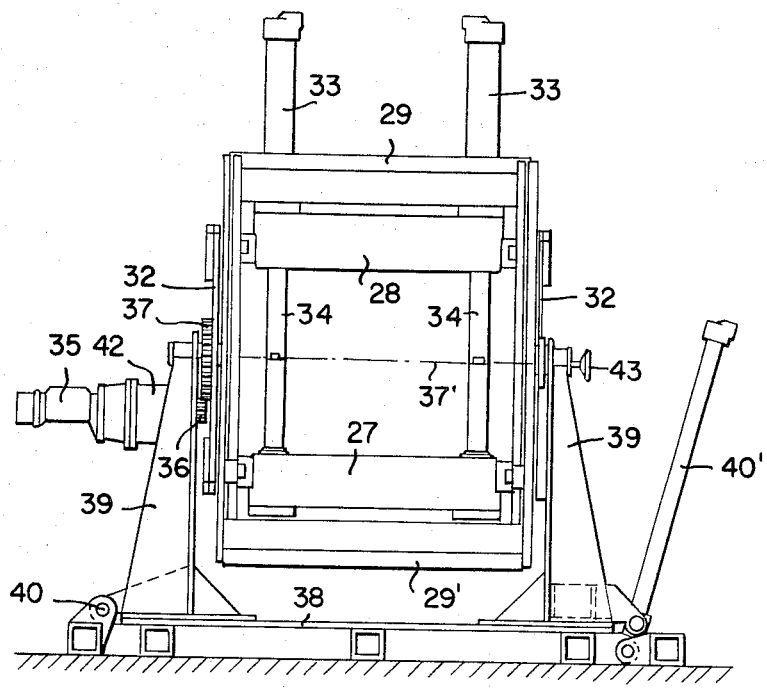
FIG. 4

FIG. 5
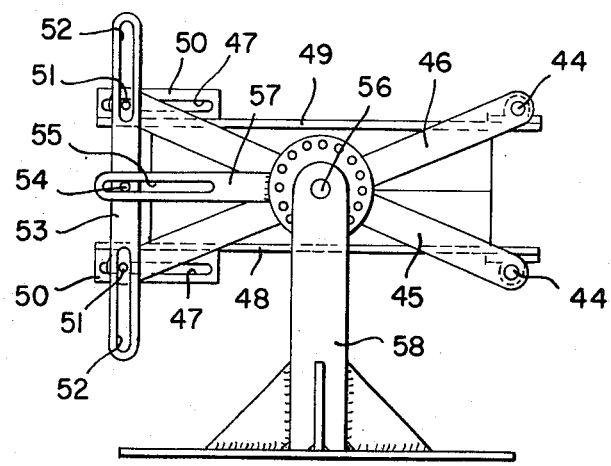
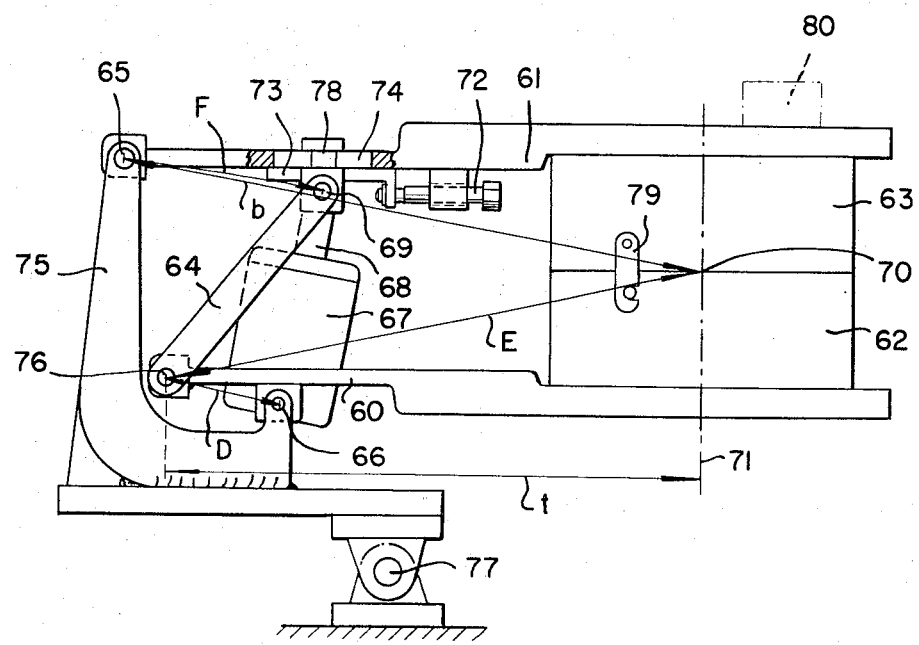
FIG. 6

COUNTERBALANCED MOUNT FOR SEPARABLE MOLD

FIELD OF THE INVENTION

The present invention relates to a mounting or platen assembly for a separable mold. More particularly this invention concerns a mold carrier for use with two-part molds which are employed to shape foamed synthetic resins.

BACKGROUND OF THE INVENTION

To date virtually the only method of opening and closing a mold has been to displace one of the mold halves toward and away from the other one. The displaceable mold half must be movable relative to the stationary half through enough distance to allow complete clearance of the formed workpiece. Usually one mold member is arranged above the other and the upper member is movable while the lower one is stationary.

Such an arrangement requires considerable room to one side of the mold-filling apparatus to enable the molded article to clear the displaceable member. It also requires a great deal of force to move the often massive mold member, and to replace it on the stationary member.

These disadvantages are particularly significant with foamed synthetic-resins. This is particularly the case whenever it would be advantageous to fill the empty, closes in one particular position and to release the finished workpiece in another such arrangements are virtually useless.

OBJECTS OF THE INVENTION

It is therefore an object of the present invention to provide an improved mold carrier or mounting or platen assembly on which a separable mold may be arranged.

Another object is the provision of an improved method of opening a mold.

Yet another object is the provision of an apparatus whereby the mold may be opened and closed without the expenditure of substantial force.

SUMMARY OF THE INVENTION

The above objects are attained according to the present invention by a mold-mounting or platen assembly wherein the mold members are carried on respective elements both of which are displaceable towards and away from a central position in which the mold is closed. These elements are connected together by a rigid link which transmits the force applied to one of the elements to the other element. This link may be at an angle to the displacement direction of the mold-carrying elements.

According to another feature of the invention one of the elements is arranged generally above the other element so that the weight of the upper element counterbalances that of the lower one. In this manner the only force needed to close or open the mold is that necessary to split the mold and to overcome friction.

According to yet another feature of the invention a pair of links are provided to each side of the mold-carrying platens or elements. These links extend at an angle to the mold split in the closed position of the mold with this angle increasing as the mold is opened. The links cross and are joined together as a scissor to each side of the mold and each link member is connected at one end to one of the mold carrying elements and at its other end to the other element.

In accordance with another feature a pivot is provided which allows rotation of the whole mold about an axis passing through the central pivot of each support scissor. Another pivot may be provided for the whole mold which is transverse to the first pivot to allow the mold to be set in virtually any position.

According to another feature of the invention the two mold halves are carried on elements pivotal about horizontal axes which are vertically and horizontally offset. The link is connected at one end to one of the pivotal elements and at the other end to the other element. The two connected ends of the link lie on opposite sides of a plane defined by the pivot axes of the two elements. In order to obtain an ideal force distribution in such an arrangement the distance between the center of gravity of the mold and the falcrum of the upper element, is twice as great as the distance between the location on that element where the link is attached and the pivot point. This proportion is 3:1 for the lower element so that the link is attached to the lower element closer to its falcrum than it is to the falcrum of the upper element.

In accordance with yet another feature of the present invention the attachment location of the single link in the last-described embodiment is displaceable.

DESCRIPTION OF THE DRAWING

The above and other objects, features, and advantages of the present invention will become more readily apparent from the following drawing, reference being made to the accompanying drawing in which:

FIG. 3 is an end view of a second embodiment of the present invention;

FIG. 4 is a side view of the apparatus shown in FIG. 3;

FIG. 5 is an end view of a third embodiment of the present invention; and

FIG. 6 is a side view of a fourth embodiment of the present invention.

SPECIFIC DESCRIPTION

Figure 1:
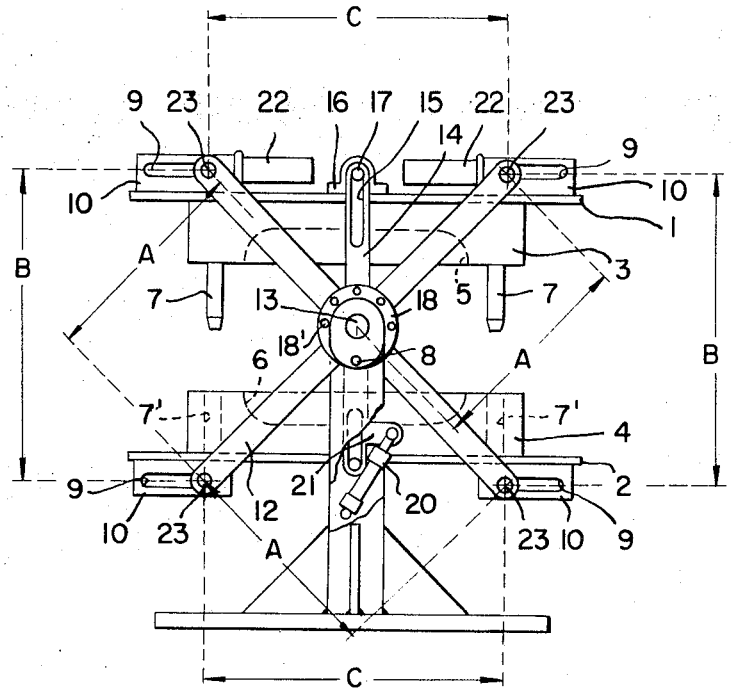
FIG. 1 is an end view of a mold mount according to the present invention.
Figure 2:
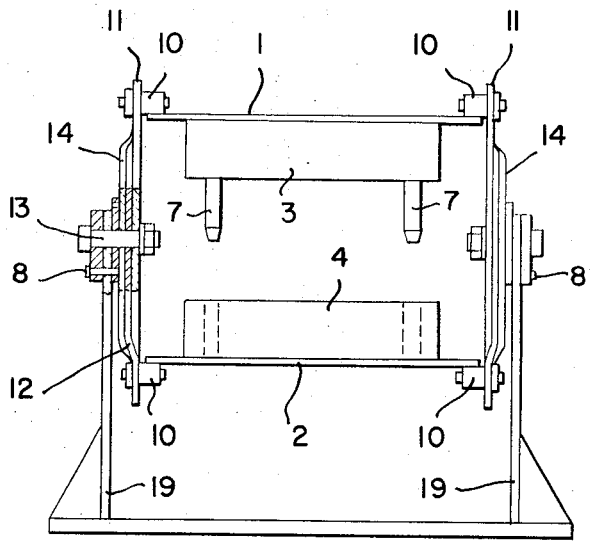
FIG. 2 is a side view of the apparatus shown in FIG. 1.

As seen in FIGS. 1 and 2 a pair of platens 1 and 2 carry respective mold halves 3 and 4, the former above the latter. The upper half 3 has a cavity 5 which forms with a cavity 5 of the lower half 4 the mold cavity. Four vertical pins 7 fixed in the upper half 3 at its corners are receivable in similarly dimensioned bores 7' in the lower half 4 for centering of the two mold members 3 and 4.

Each mold-carrying platen 1 and 2 is provided at its ends with plates 10 formed with parallel slots 9. Link members 11 and 12 have transverely projecting pins 23 provided at their ends which are received in these slots 9. These links 11 and 12 cross forming a scissor to each side of the mold 3, 4. They are pivoted together on each side of the mold at a pivot 13 fixed in a fixed upright 19. The distance A from each bolt 23 to the pivot is equal as the distance B between bolts on opposite elements always remains equal as does the distance C between bolts 23 on the same element. This ensures symmetrical movements to both sides of axes 13.

Also provided to each side of the mold 3, 4 is a vertical guide 14 pivotal around its pivot bolt 13 and formed at each end with an elongated slot 15 receiving a pin 17 carried on a cleat 16 fastened to the respective mold-carrying plate 1 or 2. The guide 14 has a laterally extending arm 21 connected via an expansible and contractile hydraulic cylinder 20 to the support 19. The center of mass of the mold 3, 4, lies at axis 13.

A disk 18 provided with a circular array of throughgoing bores 8' and is rotationally linked to the guide 14. A pin 8 is engageable through the support 19 and one of the holes 8' to rotationally arrest the mold.

Hydraulic cylinders 22 are provided on the element 1 for displacing the pins 23 in the slots 9. To this end the cylinders 22 extend parallel to the slots 9 and bear between the respective pin 23 and the plate 10.

Expansion of the cylinders 22 forces the pins 23 outwardly in the slots 9 thereby bringing the upper end of each link 11 or 12 toward the lower end of the respective link 12 or 11 thereby bringing the two mold halves 3 and 4 together. At the same time the pins 17 ensure alignment of the two mold halves.

Since the downward component of weight of the upper half 3 is translated by the links 11 and 12 acting as first-class levers into an upward component against the lower half 4, the two mold halves 3 and 4 are counterbalanced. Thus the only force that need be exerted by the four cylinders 22 is that force sufficient to spring the mold open and overcome friction and inertia. Even if the relative position of the elements 1 and 2 is changed, with the former on the bottom and the latter on the top, the device will function identically. Of course tje device will work with the two elements 1 and 2 arranged vertically next to each other.

FIGS. 3 and 4 show another arrangement wherein a pair of elements 27 and 28 are carried on scissor arms 25 and 26 much as in FIGS. 1 and 2 except that the arms 25 and 26 are provided with pins 30 carrying rollers received in grooves 31 formed in the elements 27 and 28. Each element 27, 28 is provided with a laterally extending pin 41 received in a longitudinal slot 41' in an upright 32. The ends of the links 25 and 26 are connected together by horizontal beams 29 for optimum stabilization of the mold.

Each vertical support beam 32 is received on an upright 31 carried on a base plate 38 which may be pivoted about an axis 40 by means of a hydraulic cylinder 40'. In addition each pair of arms 25, 26 is pivotal about a horizontal axis 37' on the two supports 39 by means of a motor 35 connected to these arms 25 and 26 through a transmission 42 carrying a pinion 36 engaging a gear 37. A pin 43 can lock the apparatus in any angular position about axis 37'. The pivot axis 40 is at a right angle to the axis 37'.

The upper platen 28 carries two cylinders 33 whose piston rods 34 pass through the platen and engage the lower platen 27. Thus retraction of these cylinders 33 closes the molt, thereby sliding the pins 30 in opposite directions away from each other in the grooves 31 and sliding the pins 41 towards the axis 37'. Expansion of the cylinders 33 has the opposite effect. The two elements 25 and 26 remain parallel at all times as in the embodiment of FIGS. 1 and 2, and both move at the same rate towards the central rotation axis. In FIG. 5 the two lever arms 45 and 46 are connected at each side of the mold-closing device by means of a pin 44 to the elements 48 and 49. No slot or groove is provided at these right-hand ends of the levers 45 and 46. The arms 45 and 46 are centrally pivoted at 56.

The other ends of the levers 45 and 46 carry pins 51 received in respective slots 47 formed in plates 50 carried on the elements 48 and 49 and in slots 52 formed in a guide 53. The inclination of the elements 48 and 49 to the horizontal is determined by a guide 57 fixable relative to a support stanchion 58 and formed with a slot 55 in which is received a pin 54 carried on the central portion of the guide 53.

As either of the plates 48 or 49 is moved up or down, which operation can be carried out manually in small installations, the other plate will move in the opposite direction with the pins 51 moving apart. At the same time there will be a slight lateral shifting of the two plates 48 and 49, but this is of little importance once, for instance, the injection head is pulled away from the mold.

In FIG. 6 two mold members 62 and 63 are carried on pivotal elements 60 and 61, one above the other. The element 60 and member 62 is pivoted at 66 and the member 61 at 65. A rigid link 64 is connected at one end to a pivot 76 on the very end of lever 60 and at the other end at a pivot 69 intermediate lever 61. Thus with 71 as a vertical centerline through the center of gravity of the mold 62, 63, point 70, i.e., the point at which the weights of the mold members 62 and 63 and the levers 60 and 61 are effective. In this manner lever 60 acts downwardly as a first-class lever to force lever 61 up as a third-class lever, with the link providing the load for lever 60 and the force for the lever 61.

The two pivots 65 and 66 lie in a plane inclined at 45° to the horizontal and are fixed on a support 75 which is pivotal about an axis 77 parallel to the two pivot axes 65 and 66. In addition a double-acting hydraulic cylinder 67 is braced between the pivots 66 and 69 for opening and closing of the mold 62, 63.

In order for best operation of the molt the distances D from pivot 66 to pivot 76, E from pivot 76 to center of mass 70, F from pivot 69 to pivot 65, and F from pivot 65 to center of mass 70, are dimensioned such that $F/G = (D + 1)/E$. In this manner the mold 62, 63 will tend to open automatically and a slight amount of force will have to be exerted to close it. Since closing the mold is a simple operation in which no resistance is met and opening the mold entails overcoming the adhesion of the formed workpiece to both mold members, this balance of forces is highly advantageous.

The pivot 69 is provided on a slide 73 having a necked bolt 78 engaging through a slot 74 in the upper lever arm 61. An adjustment bolt 72 is rotatable to displace this slide 73 and thereby adjust the distance F. It is also advantageous to provide a screw jack in the link 64 to vary its length for proper closing of the mold. A latch 79 is provided to lock the mold in 62, 63 in the closed position.

In operation the cylinder 67 is actuated to close the mold 62, 63 whereupon the latch 79 is closed and the foamed synthetic resin is injected into the mold cavity. After hardening the latch 79 is opened and the mold will open. At the start of the opening movement both levers 60 and 61 move apart at substantially identical rates, with these speeds changing as the various lever angles are substantially changed.

It is possible in such an arrangement so to balance the forces between the various levers that the mold, when empty, closed or stays closed, but this static situation is changed by the weight of the molded workpiece so that the mold need merely have its latch 79 disengaged to open. Thus the mold automatically opens when full and closes when empty.

Of course in this emobodiment as in any of the other embodiments calibrating weights such as shown at 80 can be attached to one or both mold-member carriers in order to compensate for mass differences arising for instance from an unevenly split mold cavity.

I claim:

1. A mounting assembly for a separable mold, said assembly comprising:
    a first element carrying one mold member and displaceable in a first direction for closing of said mold and in a second direction opposed to said first direction for opening of said mold;
    a second element carrying another mold member and displaceable at least generally in said second direction toward said first element for closing of said mold and at least generally in said first direction away from said first element for opening of said mold;
    link means including a first rigid link having ends operatively connected to said elements with said ends defining a line extending in the closed position of said mold at an angle to said directions for displacement of one of said elements in said first direction on displacement of said other element in said second direction and for displacement of said one of said elements in said second direction on displacement of said other element in said first direction and a second such link crossing said first link and pivoted thereto at the crossover location;
    a support having a pivot, both of said links and said elements being pivotal on said support, said pivot on said support being coaxial with the pivot at the crossover location of said links; and guide means pivotal about said pivot and arrestable relative to said support for maintaining said links parallel to a predetermined angular position.

2. The mounting assembly defined in claim 1, further comprising means for displacing at least one of the ends of at least one of said links relative to the respective element and transverse to said directions.

3. The mounting assembly defined in claim 1 wherein one of said elements is situated generally above the other of said elements, the center of mass of said mold lying on the axis of said pivot.

4. The mounting assembly defined in claim 1, further comprising guide means for maintenance of said elements parallel to each other at all times.

5. The mounting assembly defined in claim 1, further comprising means operatively connected to one of said members for displacing same relative to said support and thereby displacing the other member in the opposite direction.

6. The mounting assembly defined in claim 1 wherein said links are provided at their ends with second pivots operatively connecting same to said elements, said second pivots being equidistant from the first-mentioned pivot.

7. The mounting assembly defined in claim 1, further comprising a second such first link and a second such second link on the other side of said elements and both pivoted on said support at a second such pivot coaxial to the first-mentioned pivot and four connecting members substantially parallel to said pivot and each connected between an end of one of the first-mentioned links and the corresponding end of one of the second-mentioned links.

* * * * *